Dec. 29, 1936.   C. R. HUBBARD   2,066,270

ARMORED MACHINERY PACKING

Filed Oct. 9, 1935

INVENTOR
Cecil R. Hubbard,
BY
Fraser, Myers and Manley.
ATTORNEYS.

Patented Dec. 29, 1936

2,066,270

UNITED STATES PATENT OFFICE

2,066,270

ARMORED MACHINERY PACKING

Cecil R. Hubbard, Palmyra, N. Y., assignor to The Garlock Packing Company, Palmyra, N. Y., a corporation of New York Application October 9, 1935, Serial No. 44,170

4 Claims. (Cl. 288—1)

This invention relates to flexible gaskets, and more particularly to a gasket which is intended to be used in forming a leak-proof joint between the ends of two sections of pipe.

The principal object of the present invention is to provide a gasket having an armoring for certain portions thereof, which armoring will prevent the extrusion of the gasket material from the joint, and which will also protect the tip portions of the gasket from the corrosive effects of substances with which it may come into contact.

Another object of the invention is to provide a gasket having certain portions thereof covered by a metallic armoring, which latter will be substantially as flexible as the material constituting the gasket proper; and which will have sufficient strength to withstand even extraordinary abuse.

Still another object of the invention is to provide an armor made from a plurality of thin strands of relatively stiff metal so braided together as to form a sheet of material which retains all of the strength and corrosion-resisting properties of the metal, but which is far more flexible and pliable than is the metal in its ordinary form.

Other objects and various features of the invention will be more apparent from the following description, to be read in connection with the accompanying drawing, in which—

Figure 4:
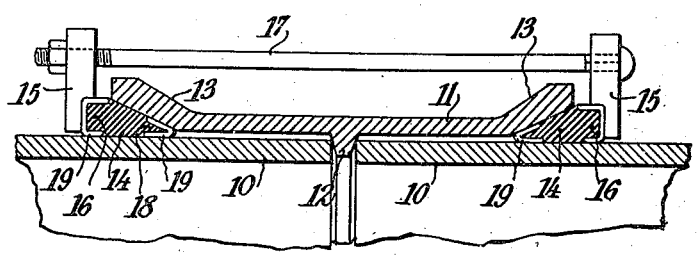
Fig. 4 is a fragmentary, elevational view illustrating the use of the gasket in forming a leak-tight joint between the adjacent ends of two sections of pipe.

In the drawing, and referring first to Fig. 4, the numerals 10—10 designate two pieces of pipe which are disposed end to end so that they may be coupled together in leak-tight relationship. As here shown, the coupling comprises a middle ring 11 having a centrally located annular flange 12 against which the ends of the pipe abut, and having flared end portions 13—13 forming recesses into which suitable gaskets 14—14 may be inserted. An annular clamping ring 15 is disposed adjacent each end of the middle ring 11 with its inner face abutting against the heel portion 16 of the gasket; and the clamping rings are interconnected by means of bolts 17 which when tightened will act upon the rings to squeeze each wedge into leak-tight relationship with the inner face of its flared portions 13 and with the outer face of the adjacent pipe 10.

Preferably the gaskets are made of rubber or other comparable material so that they may be deformed or squeezed between the adjacent parts of the joint. However, when rubber is squeezed in this manner it tends to extrude or flow from between the compressing faces; in this instance, the flared portion 13 of the middle ring, and the face of the pipe 10. This cold flow, as it is frequently termed, of course relieves the pressure on the gasket material and thus reduces its effectiveness in forming a leak-proof joint. Accordingly, it is highly desirable to reinforce the tips, or exposed portions, of the gasket to prevent this cold flow. Further, it is well recognized that rubber is particularly subject to deterioration by oil, gas, or steam, and to some extent by water or air. Since these substances comprise the principal fluids which are transmitted through pipe lines, it is evident that some means must be provided for protecting the exposed portions of the gasket against contact therewith. Preferably, this desirable reinforcing and protecting is accomplished by covering the tip portions, that is, the heel portion 16 and the toe portion 18, with an armoring 19.

The essential qualities for a good armoring material are as follows: it should have substantially the same flexibility as the material from which the gasket proper is made; it should be sufficiently strong to withstand the ordinary abuse which is occasioned by shipping and by handling in the field; and it should be substantially immune to the corrosive effects of the substances with which it may ordinarily come into contact. Such an armoring has been heretofore proposed. Thus one prior form of gasket employed a thin sheet of lead as the armoring material. The lead, while reasonably flexible and fairly effective as a corrosion protective means, did not have sufficient strength to constitute a good reinforcing means. In other words, lead being a very soft material would extrude to almost the same extent as the rubber of the gasket, and further, it was so easily damaged in the field as to be substantially useless. To avoid the difficulties encountered with lead, it was later proposed to cover the tips of the gasket with canvas.

Such a tip had adequate flexibility, and to a large extent it prevented cold flow, but it was easily damaged and it provided practically no protection against deterioration. Later it was proposed to imbed a spiral spring in the tip of the gasket material itself. This expedient was fairly successful in preventing extrusion, and it had adequate strength and flexibility, but it was totally ineffective in preventing contact between the gasket and the deteriorating substances carried in the pipe line.

The present invention proposes the use of copper, brass, bronze or other similar metals as an armoring material. These metals, as is well known, have adequate strength to withstand even extraordinary abuse, and their corrosion-resisting properties are too well known to require further comment. Thus an armoring tip made of these metals will have all of the characteristics heretofore listed except that of flexibility. In order to provide this very essential feature, the present invention proposes to braid a plurality of relatively thin strands such as wire or narrow ribbons of the selected metal into a sheet. The braiding, as will be readily apparent, will allow relative movement between the strands so that the sheet will be substantially as flexible as is the gasket material itself.

Figure 1:
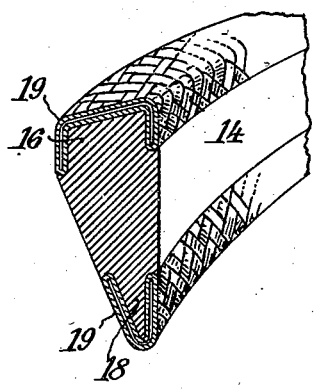
Figure 1 is a fragmentary perspective view of a gasket showing the application of the metallic tips of this invention thereto.
Figure 3:
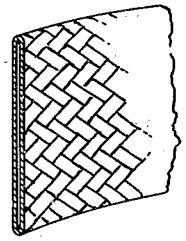
Fig. 3 is a perspective view showing the tube of Fig. 2 flattened to provide a double thickness of braided metal which may be formed to the shape of the tip portions of the gasket of Fig. 1 and applied thereto.
Figure 2:
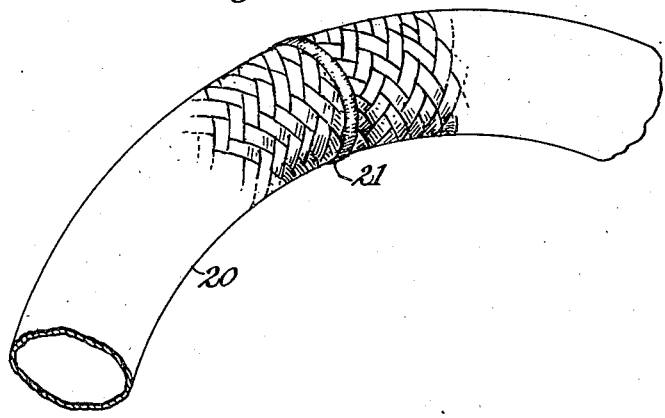
Fig. 2 is a perspective view of a fragment of a braided metal tube which is used in forming the armor of this invention.

If desired, the armor may take the form of a single strip of braided metal which is bent to the shape of the tips of the gasket and vulcanized or otherwise attached thereto. However, such a strip would have relatively rough edges which might easily tear the hands of the user, score the faces of the parts between which it is compressed, or become ensnared and tear away from the gasket. Further, a single strip of braided material might, and probably would, soon become unravelled, which obviously would reduce its effectiveness as a reinforcing and protective agent. Therefore, in the preferred embodiment, the thin strands of desired metal are braided into a tube 20, such as that shown in Fig. 2. If the armor is to be applied to the continuous, or endless, edge of a gasket, the ends of the tube are then preferably joined together, as at 21, by brazing, soldering, welding, or the like. The tube 20 is next flattened, as is shown in Fig. 3, so that in effect it then comprises two continuous layers of braided metal. The flattened tube is then bent to the shape of a tip portion of the gasket and applied thereto, as, for example, by vulcanizing. Accordingly, as is shown in Fig. 1, one such tube will be bent to wedge shape and applied to the toe portion 18, and another tube will be bent to U-shape and applied to the heel portion 16. Now, when such a gasket is inserted into the recess between the flared portion 13 of the middle ring on the outside of the pipe 10, and pressure is applied to its heel portion, the braided metal armoring will reinforce the toe and heel portion of the gasket and successfully prevent the cold flow of the gasket from the joint. Accordingly, the gasket will always be subjected to the desired pressure to maintain a constantly leak-proof connection. Further, the tip, being made of metal, will be highly effective in preventing deterioration of the gasket material. In connection with the latter feature, it should be noted that when the gasket is compressed it tries to escape, and in so doing applies a very considerable pressure to the braided metal tip. This pressure, of course, tends to force the component strands into very tight contact, which, in turn, tends to close the interstices therebetween. When the armor is made from a flattened tube, the two overlapping layers are so closely pressed together in this above described manner as to create a substantially imperforate surface. Accordingly, while the braiding provides adequate flexibility it does not substantially decrease the protective characteristics of the metal. Further, the flattened tube construction provides smooth edges, it prevents unravelling, and it substantially doubles the strength of the armor.

It may be observed that the weaving of the strands of the armor is such that they are disposed in a bias relation so that the armor may be sufficiently extensible and contractible to provide for slight variations in the actual sizes of piping nominally of a certain specified diameter.

Since certain changes may be made in the embodiment of the invention without in any way departing from the true scope thereof, it is understood that the foregoing shall be construed in a descriptive rather than in a limiting sense.

What I claim is:

1. A gasket comprising a ring of flexible packing material having a toe portion and a heel portion, and flexible reinforcing armor affixed to and extending completely over said portions, the armor for each portion comprising a layer of braided strands of metal.

2. A gasket adapted to be squeezed between two adjacent faces to create a leak-tight joint comprising a ring of flexible material having a tip portion, and a reinforcing armor affixed to and covering said portion, said armor comprising an endless tube of braided strands of relatively stiff material having two continuous superposed layers, adapted to be bent to the shape of the tip, and affixed thereto, said ring of compressible material being adapted upon compression to force the strands of the armoring material into contact one with another whereby to form a substantially imperforate surface.

3. A gasket adapted to be squeezed between the adjacently disposed faces of two articles which are to be connected together to create a leak-tight joint therebetween, comprising a body of flexible packing material having a tip portion which is unconfined by the faces of the articles when the gasket is so squeezed, and a reinforcing armor for said portion comprising a tube of braided strands of relatively stiff material having two continuous layers adapted to be bent to the shape of the tip and affixed thereto, said body of compressible material being adapted upon compression, to force the strands of the armoring material into contact one with another whereby to form a substantially imperforate surface.

4. A gasket comprising a body of flexible packing material which is adapted to be squeezed between the adjacently disposed faces of two articles to create a leak-tight joint therebetween, said body having a tip portion which is unconfined by such faces when so squeezed, and an armoring for said tip portion comprising a tube of braided metal strands which has been flattened to provide two superposed layers, bent to the shape of the tip and affixed thereto.

CECIL R. HUBBARD.